(12) United States Patent
Kim et al.

(10) Patent No.: US 11,266,222 B2
(45) Date of Patent: Mar. 8, 2022

(54) COSMETICS CONTAINING OTHER COSMETIC MATERIALS

(71) Applicant: AMOREPACIFIC CORPORATION, Seoul (KR)

(72) Inventors: Jun Young Kim, Seoul (KR); Ju Ho Kim, Seoul (KR); Chang Gyu Yoo, Seoul (KR)

(73) Assignee: AMOREPACIFIC CORPORATION, Seoul (KR)

( * ) Notice: Subject to any disclaimer, the term of this patent is extended or adjusted under 35 U.S.C. 154(b) by 559 days.

(21) Appl. No.: 16/304,855

(22) PCT Filed: May 25, 2017

(86) PCT No.: PCT/KR2017/005457
§ 371 (c)(1),
(2) Date: Nov. 27, 2018

(87) PCT Pub. No.: WO2017/209444
PCT Pub. Date: Dec. 7, 2017

(65) Prior Publication Data
US 2020/0323328 A1    Oct. 15, 2020

(30) Foreign Application Priority Data
May 30, 2016    (KR) .................. 10-2016-0066408

(51) Int. Cl.
*A45D 40/24*    (2006.01)
*A45D 33/00*    (2006.01)
(Continued)

(52) U.S. Cl.
CPC ............ *A45D 40/24* (2013.01); *A45D 33/006* (2013.01); *A45D 33/24* (2013.01); *A45D 40/22* (2013.01);
(Continued)

(58) Field of Classification Search
CPC ...... A45D 40/24; A45D 33/006; A45D 33/24; A45D 40/22; A45D 2040/0006;
(Continued)

(56) References Cited

U.S. PATENT DOCUMENTS 6,715,950 B2 * 4/2004 Kim ...................... B43K 27/04
401/199
7,625,149 B2 * 12/2009 Hanson ................... B05D 1/28
401/196

(Continued)

FOREIGN PATENT DOCUMENTS

KR    10-2007-0078720 A    8/2007
KR    20-0473967 Y1    8/2014
(Continued)

*Primary Examiner* — David J Walczak
(74) *Attorney, Agent, or Firm* — Heedong Chae; Lucem PC

(57) ABSTRACT

A cosmetic separately containing a different cosmetic material, which includes a cosmetic container; an impregnation member accommodated in the cosmetic container and impregnated with a cosmetic material; and a containing body provided separately from the cosmetic container, wherein the containing body contains another cosmetic material, and two kinds of cosmetic materials are mixed with each other for use while the containing body is placed on the impregnation member of the cosmetic container.

13 Claims, 6 Drawing Sheets

(51) Int. Cl.
    *A45D 33/24*     (2006.01)
    *A45D 40/00*     (2006.01)
    *A45D 40/22*     (2006.01)
    *D04H 13/00*     (2006.01)

(52) U.S. Cl.
    CPC ..... *D04H 13/00* (2013.01); *A45D 2040/0006* (2013.01); *A45D 2200/058* (2013.01); *A45D 2200/1018* (2013.01)

(58) Field of Classification Search
    CPC ...... A45D 2200/058; A45D 2200/1018; A45D 40/26; A45D 40/262; A45D 33/008; A45D 33/025; A45D 33/16; D04H 13/00
    USPC ............. 401/198, 199, 40–43, 23, 293, 294; 132/293, 314, 294, 295, 299, 303, 305
    See application file for complete search history.

(56) References Cited

U.S. PATENT DOCUMENTS 7,726,896 B2 *    6/2010    Bolton ................... B43K 27/00
                                                                                                401/195
9,359,120 B2 *    6/2016    Kovell ................. B65D 75/366

FOREIGN PATENT DOCUMENTS

| KR | 10-1466854 B1 | 11/2014 |
| KR | 10-2015-0020153 A | 2/2015 |
| KR | 10-1527694 B1 | 6/2015 |

\* cited by examiner

-- PRIOR ART --

COSMETICS CONTAINING OTHER COSMETIC MATERIALS

TECHNICAL FIELD

This application is based on and claims the benefit of priority to Korean Patent Application No. 10-2016-0066408 filed on May 30, 2016, with the Korean Intellectual Property Office, the disclosure of which is incorporated herein by reference.

TECHNICAL FIELD

The present invention relates to a cosmetic separately containing a different cosmetic material, and more specifically, to a cosmetic separately containing a different cosmetic material which includes a cosmetic container in which an impregnation member is accommodated, and a containing member containing another cosmetic, where the containing member includes a containing body provided in a case to contain another cosmetic, a frame attached to an outside of the containing body to maintain an appearance of the containing body, and a sealing sheet provided on a top surface of the case to prevent the cosmetic material of the containing body from evaporating or volatilizing. In addition, when a user presses the containing body with a puff to use the cosmetic material after removing the sealing sheet and putting the containing body attached to the frame on the top end of the impregnation member, another cosmetic material contained in the containing body and the one cosmetic material impregnated in the impregnation member are mixed with each other while being stuck on the puff, so that the two kinds of cosmetics may be used at once.

BACKGROUND ART

Cosmetics refer to goods which are used for a human body in order to add charming of the human body and change the appearance of the human body to be brighter, or to maintain or enhance skin or hair in a healthy state by making the human body clean and beautiful, and have a minor effect on the human body.

In general, cosmetics are manufactured by mixing mutually different materials using an emulsifying agent such as a surface active agent, and the cosmetic materials may be classified into water-in-oil (W/O) emulsion type cosmetic material and oil-in-water (O/W) emulsion type cosmetic material according to the bonding structure between water-based material and oil-based material.

The water-in-oil emulsion type cosmetic material, which is obtained by bonding an oil-based material to an outside of water-based material, has a larger quantity of oil so that the absorption of skin is slow and the touch feeling is heavy, but the persistence is longer than that of the oil-in-water emulsion type cosmetic material. Thus, the cosmetics requiring persistence are manufactured by using the W/O emulsion type cosmetic material to increase water resistance against sweat and water.

The cosmetics are manufactured reduce the viscosity of content in order to compensate the defects of the W/O emulsion type cosmetic material that the touch feeling is heavy and sticky. However, when the water-in-oil product having low viscosity remains for a long time in circulation, the aqueous material of internal phase and the oil materials of external phase may be separated from each other. In this case, a user shakes a container to mix the separated aqueous and oil materials with each other for use, but it is inconvenient to shake the container for use.

To solve the problems described above, as shown in FIG. 1, a product, which disclosed in Korean Registered Patent No. 10-1159877 issued to the applicant of the present application, has been developed, where an impregnation member 1 impregnated with water-in-oil contents having low viscosity is contained in a compact container.

However, according to the above-described related art, since the impregnation member 1 is provided in a form of a single entity, the impregnation member 1 can be impregnated with only one kind of cosmetic. Therefore, when the user desires to use two kinds of cosmetics at the same time, the two kinds of cosmetics must be separately prepared and mixed with each other for use.

DISCLOSURE

Technical Problem

To solve the problems described above, an object of the present invention is to provide a cosmetic separately containing a different cosmetic material, which includes a cosmetic container in which an impregnation member is accommodated, and a containing member containing another cosmetic, where the containing member includes a containing body provided in a case to contain another cosmetic, a frame attached to an outside of the containing body to maintain an appearance of the containing body, and a sealing sheet provided on a top surface of the case to prevent the cosmetic material of the containing body from evaporating or volatilizing. In addition, when a user presses the containing body with a puff to use the cosmetic material after removing the sealing sheet and putting the containing body attached to the frame on the top end of the impregnation member, another cosmetic material contained in the containing body and the one cosmetic material impregnated in the impregnation member are mixed with each other while being stuck on the puff, so that the two kinds of cosmetics may be used at once.

In addition, another object of the present invention is to provide a cosmetic separately containing a different cosmetic material, which can allow a user to use a desired cosmetic material while the user places a containing body containing the desired cosmetic material on an impregnation member of a cosmetic container and to easily exchange the containing body by containing a functional cosmetic material in the containing body, thereby enabling the user to easily apply makeup.

Technical Solution

According to the present invention, there is provided a cosmetic separately containing a different cosmetic material, which includes:

a cosmetic container (10);

an impregnation member (20) accommodated in the cosmetic container (10) and impregnated with a cosmetic material; and a containing body (32) provided separately from the cosmetic container (10), wherein the containing body (32) contains another cosmetic material and two kinds of cosmetic materials are mixed with each other for use while the containing body (32) is placed on the impregnation member (20) of the cosmetic container (10).

The containing body (32) may include an outlet (322).

The cosmetic may further include a frame (34) coupled to the containing body (32) to maintain a shape of the containing body (32).

The containing body (32) may be accommodated in a case (40), and a sealing sheet (50) is attached to an upper end of the case (40) to prevent the cosmetic material contained in the containing body (32) from evaporating or volatilizing.

The containing body (32) may be formed of a fiber material including a nonwoven fabric.

The containing body (32) may contain a functional cosmetic material.

The frame (34) may be formed in a ring shape and has an outer diameter less than a diameter of the impregnation member (20).

In addition, when the containing body (32) is pressed with a puff (P) while the containing body (32) is placed on the impregnation member (20) of the cosmetic container (10), the cosmetic material impregnated in the impregnation member (20) is discharged through the outlet (322) of the containing body (32) is mixed with another cosmetic material contained in the containing body (32) while being stuck on the puff (P).

Advantageous Effects

According to the present invention, the cosmetic separately containing a different cosmetic material includes the cosmetic container in which the impregnation member is accommodated, and the containing member containing another cosmetic, where the containing member includes the containing body provided in the case to contain another cosmetic, the frame attached to the outside of the containing body to maintain the appearance of the containing body, and the sealing sheet provided on the top surface of the case to prevent the cosmetic material of the containing body from evaporating or volatilizing. In addition, when a user presses the containing body with a puff to use the cosmetic material after removing the sealing sheet and putting the containing body attached to the frame on the top end of the impregnation member, another cosmetic material contained in the containing body and the one cosmetic material impregnated in the impregnation member are mixed with each other while being stuck on the puff, so that the two kinds of cosmetics may be used at once.

In addition, the cosmetic separately containing a different cosmetic material can allow a user to use a desired cosmetic material while the user places the containing body containing the desired cosmetic material on the impregnation member of the cosmetic container and to easily exchange the containing body by containing the functional cosmetic material in the containing body, thereby enabling the user to easily apply makeup.

BEST MODE

Mode for Invention

Figure 1:
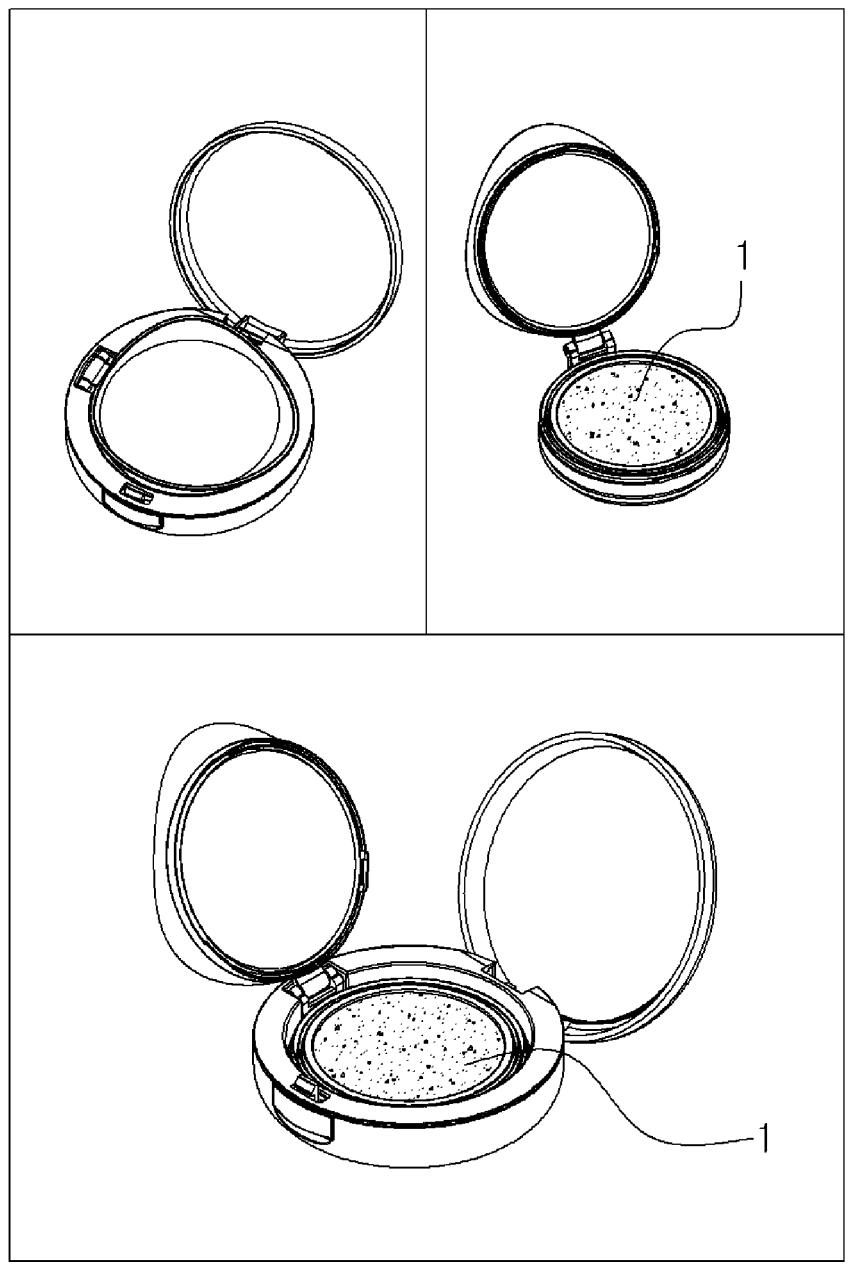
FIG. 1 is a perspective view showing a compact container according to the related art.
Figure 2:
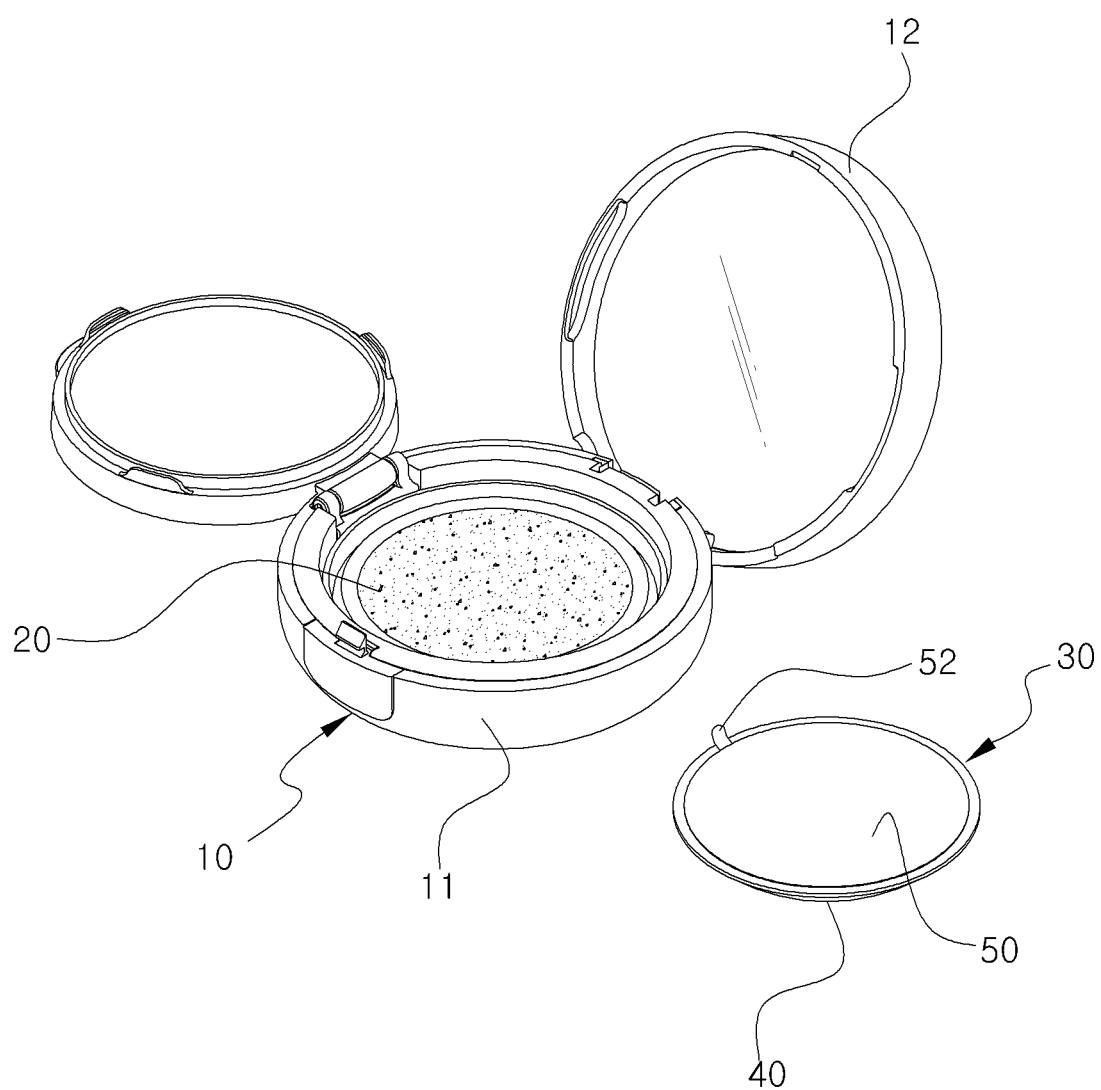
FIG. 2 is a perspective view showing a cosmetic separately containing a different cosmetic material according to an embodiment of the present invention.
Figure 3:
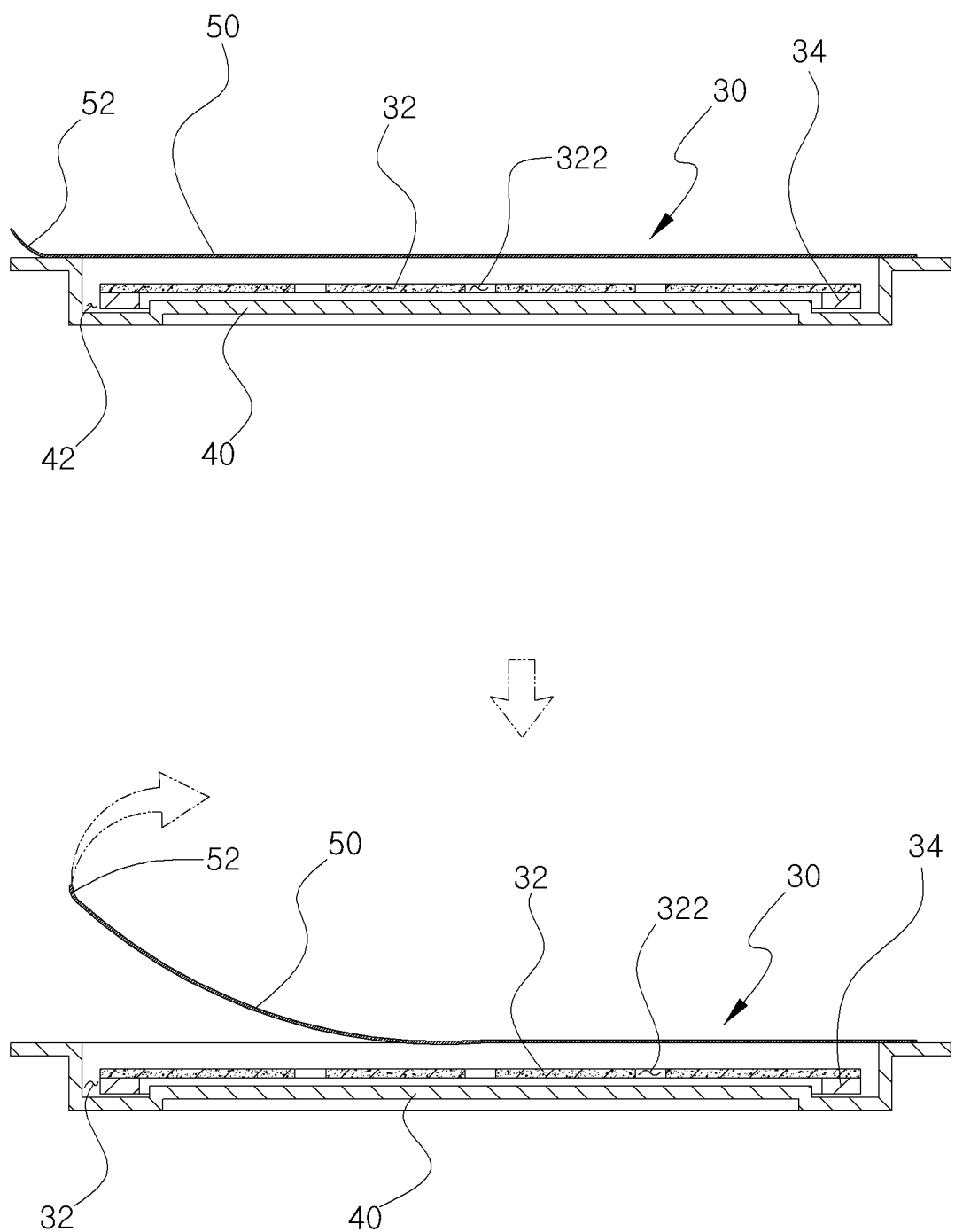
FIG. 3 is a sectional view showing a containing member of a cosmetic separately containing a different cosmetic material according to an embodiment of the present invention and a state of removing a sealing sheet from the containing member.
Figure 4:
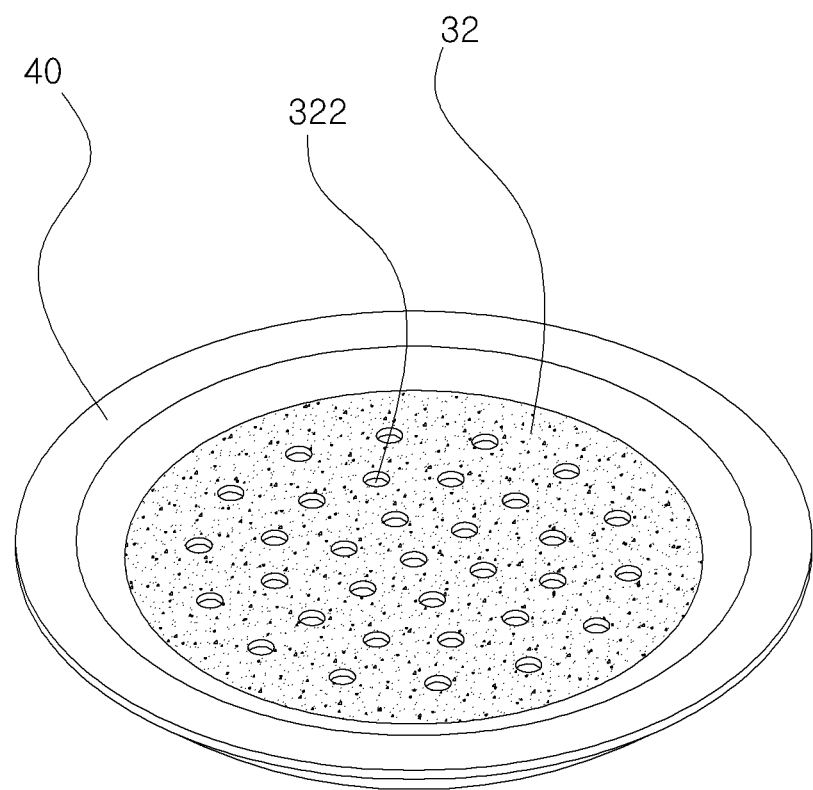
FIG. 4 is a perspective view showing a containing member from which a sealing sheet of a cosmetic separately containing a different cosmetic material according to an embodiment of the present invention is removed.
Figure 5:
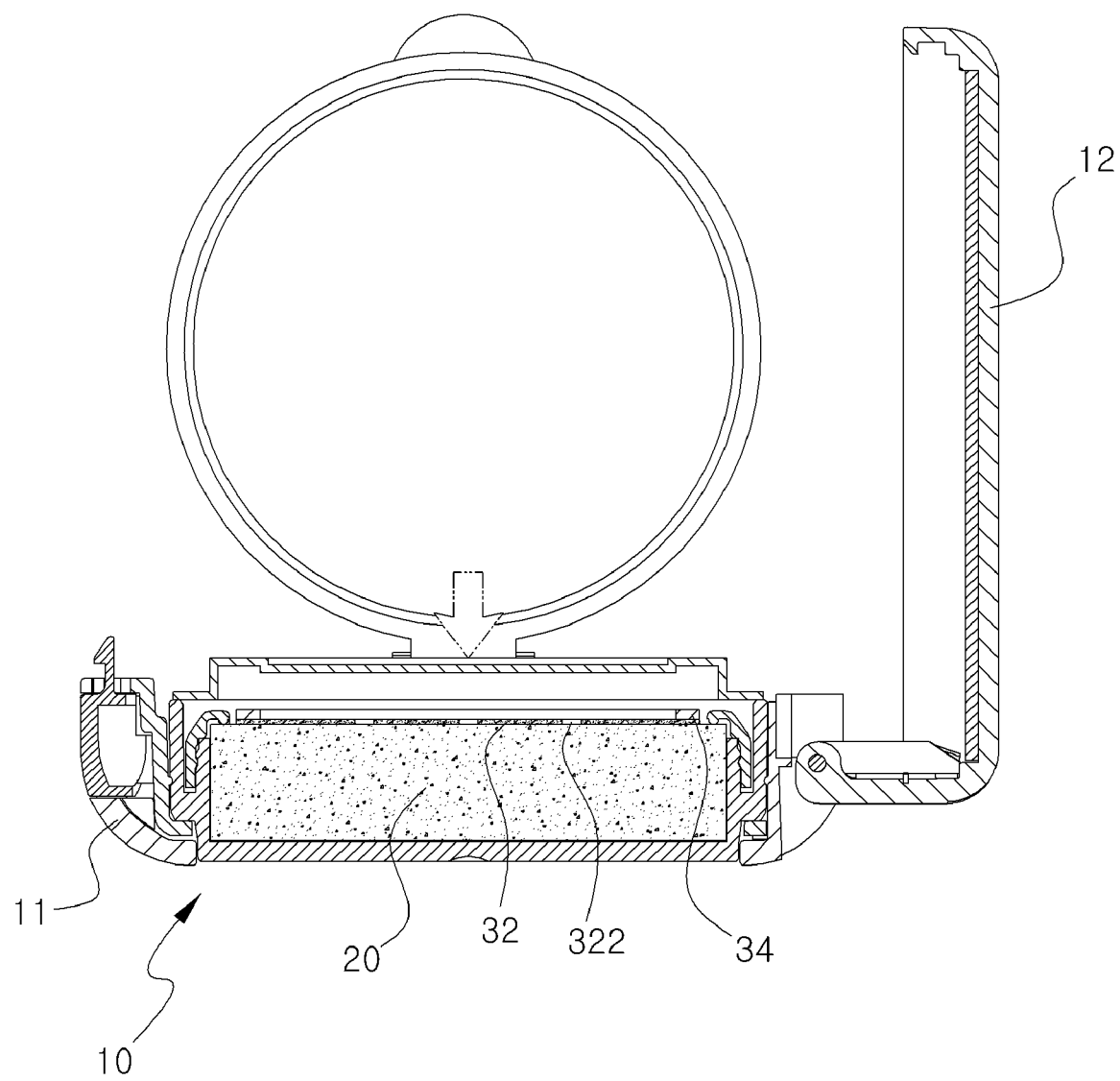
FIG. 5 is a sectional view showing a cosmetic separately containing a different cosmetic material according to an embodiment of the present invention.
Figure 6:
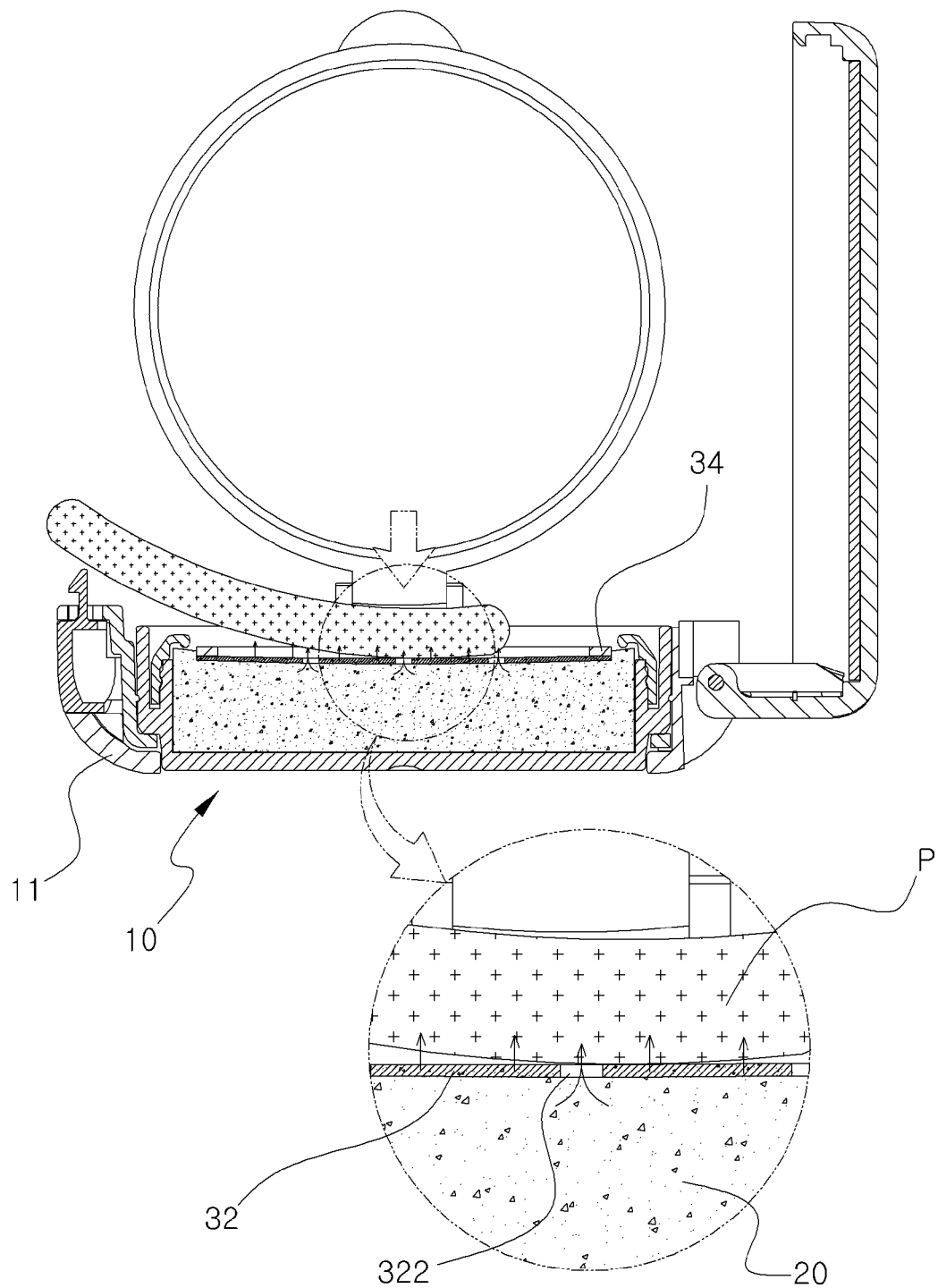
FIG. 6 is a sectional view showing a state in which the content of a cosmetic separately containing a different cosmetic material according to an embodiment of the present invention is stuck on a puff.

FIG. 2 is a perspective view showing a cosmetic separately containing a different cosmetic material according to an embodiment of the present invention. FIG. 3 is a sectional view showing a containing member of a cosmetic separately containing a different cosmetic material according to an embodiment of the present invention and a state of removing a sealing sheet from the containing member. FIG. 4 is a perspective view showing a containing member from which a sealing sheet of a cosmetic separately containing a different cosmetic material according to an embodiment of the present invention is removed. FIG. 5 is a sectional view showing a cosmetic separately containing a different cosmetic material according to an embodiment of the present invention. FIG. 6 is a sectional view showing a state in which the content of a cosmetic separately containing a different cosmetic material according to an embodiment of the present invention is stuck on a puff.

According to the present invention, there is provided a cosmetic separately containing a different cosmetic material, which includes a cosmetic container 10, an impregnation member 20 accommodated in the cosmetic container 10 and impregnated with a cosmetic material; and a containing body 32 provided separately from the cosmetic container 10, wherein the containing body 32 contains another cosmetic material, and two kinds of cosmetic materials are mixed with each other for use while the containing body 32 is placed on the impregnation member 20 of the cosmetic container 10.

The cosmetic container 10 includes a container main body 11, and a container lid 12 coupled to the container main body 11.

The impregnation member 20 is mounted on the container main body 11 and impregnated with a cosmetic material.

The impregnated member 50 includes at least one selected from the group consisting of butadiene rubber (BR), styrene butadiene rubber (SBR), natural rubber (NR), natural rubber styrene butadiene rubber (NRSBR), acrylonitrile-butadiene rubber (NBR), wet urethane, dry urethane, polyether, polyester, polyvinyl chloride, polyethylene, ethylene vinyl acetate, latex, silicon, styrene isoprene styrene, styrene ethylene butylene styrene, polyvinyl alcohol, silicone agent elastomer, nitrile rubber, butyl rubber and neoprene.

The container lid 12 may be hinge-coupled, screw-coupled or under-cut-coupled to the container main body 11.

A containing member 30 is provided separately from the cosmetic container 10.

The containing member 30 includes a case (40), a containing body 32 installed into the case 40, a frame 34 attached to an outside of the containing body 32, and a sealing sheet 50 provided on a top end of the case 40.

The containing body 32 may be formed of a fiber material such as a nonwoven fabric to easily contain a cosmetic material.

A material of the containing body 32 may be formed of a synthetic fiber, a sponge, a pulp sheet and the like.

The cosmetic material contained into the containing body 32 is different from a cosmetic material impregnated to the impregnation member 20. A cosmetic material having a general functionality may be contained in the containing body 32.

Since the containing body 32 contains a cosmetic material having functionality, a user may use two kinds of cosmetic materials while mixing the cosmetic materials with each other after placing the containing body 32 containing the cosmetic material desired by the user immediately before using the containing body 32. In addition, the containing body 32 is easily changeable or exchangeable, so that a user may effectively apply makeup.

An outlet 322 may be formed in the containing body 32. As shown in FIG. 6, when the containing body 32 is placed on the top surface of the impregnation member 20, the cosmetic material impregnated into the impregnation member 20 is easily discharged through the outlet 322.

However, it is not necessary to form the outlet 322 in the containing body 32. Since the containing body 32 may be formed of a fiber material such as a nonwoven fabric, the cosmetic material of the impregnation member 20 passes through the containing body 32, so that the cosmetic material of the impregnation member 20 and the cosmetic material in the containing body 32 may be used while being mixed with each other.

The frame 34 is attached to the outside of the containing body 32 to maintain the form of the containing body 32.

The frame 34 is formed in a ring shape. The outer diameter of the frame 34 is less than that of the impregnation member 20.

As shown FIG. 5, since the outer diameter of the frame 34 is less than that of the impregnation member 20, the frame 34 may be placed on the top surface of the impregnation member 20.

The containing body 32 attached to the frame 34 is mounted in the case 40.

As shown in FIG. 3, the containing body 32 is placed on the bottom of the case 40 and is formed on an edge portion thereof with a frame storage part 42, such that the frame 34 is placed in the frame storage part 42.

An upper end of the case 40 is sealed with the sealing sheet 50.

The sealing sheet 50 prevents the cosmetic material contained in the containing body (32) mounted in the case 40 from evaporating or volatilizing.

A handle 52 is formed on one side of the sealing sheet 50. The handle 52 enables the sealing sheet to be easily removed.

Hereinafter, a method of using the cosmetic separately containing a different cosmetic material according to an embodiment of the present invention will be described in detail.

As shown in FIG. 3, to use the cosmetic separately containing a different cosmetic material according to the present invention, the sealing sheet 50 of the containing body 30 is removed.

As shown in FIG. 5, after removing the sealing sheet 50, the containing body 32 to which the frame 34 is attached is placed on the top end of the impregnation member 20 of the cosmetic container 10.

Thereafter, as shown in FIG. 6, when the containing body 32 is pressed with the puff 'P' to use the cosmetic material, one cosmetic material impregnated in the impregnation member 20 and another cosmetic material contained in the containing body 32 are simultaneously stuck on the puff 'P' while being mixed with each other, so that two kinds of cosmetic materials may be used at once.

As described above, the compact cosmetics container having an opening/closing button formed in a lid thereof described in this disclosure is an illustrative purpose only, and the present invention is not limited thereto. Thus, it should be understood that numerous other modifications and embodiments can be devised by those skilled in the art within the spirit and scope of the present invention and they will fall within the scope of the present invention.

DESCRIPTION OF REFERENCE NUMERAL

10: Cosmetic container
11: Container main body
12: Container lid
20: Impregnation member
30: Containing member
32: Containing body
322: Outlet
34: Frame
40: Case
42: Frame storage part
50: Sealing sheet
52: Handle

The invention claimed is:

1. A cosmetic separately containing a different cosmetic material, the cosmetic comprising:
   a cosmetic container (10) in which an impregnation member (20) impregnated with a cosmetic material is accommodated; and
   a containing body (32) separately provided to contain another cosmetic material,
   wherein, the containing body (32) is placed on the impregnation member (20) of the cosmetic container (10) and the containing body (32) is pressed, the cosmetic material impregnated in the impregnation member (20) passes through the containing body (32) and mixes with the cosmetic material contained in the containing body (32) to apply both of the cosmetic materials simultaneously.

2. The cosmetic of claim 1, wherein the containing body (32) includes an outlet (322).

3. The cosmetic of claim 1, further comprising a frame (34) coupled to the containing body (32) to maintain a shape of the containing body (32).

4. The cosmetic of claim 3, wherein the frame (34) is formed in a ring shape and has an outer diameter less than a diameter of the impregnation member (20).

5. The cosmetic of claim 1, wherein the containing body (32) is accommodated in a case (40), and
   a sealing sheet (50) is attached to an upper end of the case (40) to prevent the cosmetic material contained in the containing body (32) from evaporating or volatilizing.

6. The cosmetic of claim 1, wherein the containing body (32) is formed of a fiber material including a nonwoven fabric.

7. The cosmetic of claim 1, wherein the containing body (32) contains a functional cosmetic material.

8. A cosmetic separately containing a different cosmetic material, the cosmetic comprising:
   a cosmetic container (10);
   an impregnation member (20) accommodated in the cosmetic container (10) and impregnated with a cosmetic material; and a containing body (32) provided separately from the cosmetic container (10), wherein the containing body (32) contains another cosmetic material and the cosmetic material of the impregnation member (20) passes through the containing body (32) to mix with the other cosmetic material when the containing body (32) is placed on the impregnation member (20) of the cosmetic container (10), and wherein, when the containing body (32) is pressurized, the two kinds of cosmetic materials are mixed with each other.

9. The cosmetic of claim 8, wherein the containing body (32) includes an outlet (322).

10. The cosmetic of claim 8, further comprising a frame (34) coupled to the containing body (32) to maintain a shape of the containing body (32).

11. The cosmetic of claim 8, wherein the containing body (32) is accommodated in a case (40), and a sealing sheet (50) is attached to an upper end of the case (40) to prevent the cosmetic material contained in the containing body (32) from evaporating or volatilizing.

12. The cosmetic of claim 8, wherein the containing body (32) is formed of a fiber material including a nonwoven fabric.

13. The cosmetic of claim 8, wherein the containing body (32) contains a functional cosmetic material.

* * * * *